United States Patent
Kira et al.

(10) Patent No.: US 9,342,057 B2
(45) Date of Patent: May 17, 2016

(54) MOTOR CONTROL APPARATUS

(71) Applicant: KABUSHIKI KAISHA YASKAWA DENKI, Kitakyushu-shi (JP)

(72) Inventors: Toshinobu Kira, Kitakyushu (JP); Tadashi Okubo, Kitakyushu (JP); Yasuyuki Takei, Kitakyushu (JP); Makoto Akama, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 6 days.

(21) Appl. No.: 14/464,707

(22) Filed: Aug. 21, 2014

(65) Prior Publication Data

US 2014/0354208 A1    Dec. 4, 2014

Related U.S. Application Data

(63) Continuation of application No. PCT/JP2012/054607, filed on Feb. 24, 2012.

(51) Int. Cl.
*G05B 11/01* (2006.01)
*G05B 6/02* (2006.01)
(Continued)

(52) U.S. Cl.
CPC .............. *G05B 6/02* (2013.01); *H02P 29/0005* (2013.01); *H02P 29/025* (2013.01)

(58) Field of Classification Search
CPC .... G05B 19/19; G05B 19/186; G05B 19/358; G05B 19/404; G05B 19/416; G05B 2219/37388; G05B 2219/37621; G05B 2219/41107; G05B 2219/41123; G05B 2219/41177; G05B 2219/41207; G05B 2219/42062

USPC .......... 318/430, 432, 609, 610, 611, 560, 561
See application file for complete search history.

(56) References Cited

U.S. PATENT DOCUMENTS

| | | | | |
|---|---|---|---|---|
| 5,428,285 A | * | 6/1995 | Koyama | ................. G05B 17/02 318/560 |
| 5,801,509 A | | 9/1998 | Sawa et al. | |

(Continued)

FOREIGN PATENT DOCUMENTS

| | | |
|---|---|---|
| CN | 1148448 | 4/1997 |
| CN | 1240064 | 12/1999 |

(Continued)

OTHER PUBLICATIONS

International Search Report for corresponding International Application No. PCT/JP2012/054607, Apr. 10, 2012.

(Continued)

*Primary Examiner* — Paul Ip
(74) *Attorney, Agent, or Firm* — Mori & Ward, LLP

(57) ABSTRACT

This disclosure discloses a motor control apparatus including a controller. The controller includes a position controller and a speed controller. The controller is configured to control the inverter on the basis of the torque command. The controller includes a torque limiter configured to start first torque limitation which limits a commanded torque based on the torque command to a first torque or less in a case where the voltage detector detects that the DC voltage falls below a predetermined voltage, and to cancel the first torque limitation in a case where the voltage detector detects that the DC voltage exceeds the predetermined voltage. The controller includes a speed limiter configured to limit a commanded speed based on the speed command to a first speed or less in a case where the torque limiter cancels the first torque limitation.

19 Claims, 10 Drawing Sheets

(51) Int. Cl.
*H02P 29/00* (2016.01)
*H02P 29/02* (2016.01)

(56) References Cited

U.S. PATENT DOCUMENTS

| | | | |
|---|---|---|---|
| 6,081,093 A | 6/2000 | Oguro et al. | |
| 6,315,081 B1* | 11/2001 | Yeo | B66B 5/02 187/290 |
| 6,328,551 B1* | 12/2001 | Takatsugi | B29C 45/84 425/145 |
| 6,462,492 B1* | 10/2002 | Sakamoto | H02P 6/18 318/400.02 |
| 6,515,442 B1* | 2/2003 | Okubo | G05B 19/19 318/560 |
| 6,683,428 B2* | 1/2004 | Pavlov | H02P 21/13 318/432 |
| 7,215,089 B2* | 5/2007 | Toyozawa | G05B 19/186 318/434 |
| 7,331,208 B2* | 2/2008 | Fujibayashi | B21D 24/02 72/20.1 |
| 7,344,003 B2* | 3/2008 | Kimura | B66B 11/008 187/256 |
| 7,348,745 B2* | 3/2008 | Okita | G05B 19/358 318/432 |
| 7,498,761 B2* | 3/2009 | Iwashita | H02P 29/028 318/609 |
| 7,541,763 B2* | 6/2009 | Aono | H02P 5/74 318/432 |
| 7,791,911 B2* | 9/2010 | Kaitani | H02M 7/53875 307/66 |
| 7,902,780 B2* | 3/2011 | Okita | G05B 19/404 318/432 |
| 7,911,172 B2* | 3/2011 | Ikeda | G05B 19/19 318/560 |
| 7,915,851 B2* | 3/2011 | Hishikawa | G05B 19/416 318/567 |
| 7,969,113 B2* | 6/2011 | Ide | H02P 6/001 318/560 |
| 2003/0146723 A1* | 8/2003 | Pavlov | H02P 21/146 318/432 |
| 2005/0168178 A1* | 8/2005 | Toyozawa | G05B 19/186 318/68 |
| 2005/0168186 A1* | 8/2005 | Matsubara | H02P 21/0035 318/575 |
| 2005/0217945 A1* | 10/2005 | Kimura | B66B 11/008 187/277 |
| 2005/0281680 A1 | 12/2005 | Schulz | |
| 2006/0012321 A1 | 1/2006 | Rozman et al. | |
| 2006/0061318 A1* | 3/2006 | Aono | H02P 5/74 318/625 |
| 2006/0090533 A1* | 5/2006 | Fujibayashi | B21D 24/02 72/351 |
| 2006/0138990 A1* | 6/2006 | Ide | G05B 19/19 318/609 |
| 2006/0145649 A1* | 7/2006 | Iura | H02P 23/06 318/727 |
| 2006/0158143 A1* | 7/2006 | Okita | G05B 19/358 318/276 |
| 2007/0176573 A1* | 8/2007 | Iwashita | H02P 29/028 318/723 |
| 2009/0009126 A1* | 1/2009 | Hishikawa | G05B 19/416 318/600 |
| 2009/0026021 A1* | 1/2009 | Kimura | B66B 11/008 187/293 |
| 2009/0052209 A1* | 2/2009 | Kaitani | H02M 7/53875 363/37 |
| 2009/0236160 A1 | 9/2009 | Tanaka et al. | |
| 2009/0284208 A1* | 11/2009 | Ikeda | H02P 6/16 318/621 |
| 2010/0060226 A1* | 3/2010 | Ide | H02P 6/001 318/611 |
| 2010/0148714 A1* | 6/2010 | Okita | G05B 19/404 318/561 |
| 2011/0220629 A1* | 9/2011 | Mehn | B23K 9/125 219/136 |
| 2014/0070752 A1 | 3/2014 | Otsuji et al. | |

FOREIGN PATENT DOCUMENTS

| | | |
|---|---|---|
| EP | 1617553 | 1/2006 |
| JP | 07-115791 | 5/1995 |
| JP | 08-022330 | 1/1996 |
| JP | 2002-142483 | 5/2002 |
| JP | 2009-227147 | 10/2009 |
| JP | 2012-039847 | 2/2012 |
| WO | WO 2008/093485 | 8/2008 |

OTHER PUBLICATIONS

Written Opinion for corresponding International Application No. PCT/JP2012/054607, Apr. 10, 2012.

Holtz J et al., "Controlled AC drives with ride-through capability at power interruption", Industry Applications Society Annual Meeting, Conference Record of the 1993 IEEE, Oct. 2, 1993, pp. 629-636, Toronto, Ont., Canada, New York, NY, USA, XP010118698.

M.H.J. Bollen., "The influence of motor re-acceleration on voltage sags", Industry Applications Society Annual Meeting, Conference Record of the 1994 IEEE, Jan. 1, 1994 pp. 2235-2242, Denver, CO, USA, XP055253091.

Chinese Office Action for corresponding CN Application No. 201280070654.0, Mar. 11, 2016.

Extended European Search Report for corresponding EP Application No. 12869285.2-1806, Mar. 8, 2016.

* cited by examiner

MOTOR CONTROL APPARATUS

CROSS-REFERENCE TO RELATED APPLICATION

This is a continuation application PCT/JP2012/054607, filed Feb. 24, 2012, which was published under PCT article 21(2) in English.

FIELD OF THE INVENTION

The disclosed embodiment relates to a motor control apparatus.

DESCRIPTION OF THE RELATED ART

A motor control apparatus that can continuously operate even if a momentary power interruption occurs in a power supply is known.

SUMMARY OF THE INVENTION

According to one aspect of the disclosure, there is provided a motor control apparatus. The motor control apparatus includes a main circuit including a converter configured to convert AC power supply into DC power supply, a smoothing capacitor connected in parallel with the DC power supply, and an inverter configured to convert the DC power supply into AC power supply to drive a motor, a voltage detector configured to detect DC voltage of the main circuit, and a controller. The controller includes a position controller configured to generate a speed command on the basis of a positional command and a motor position, and a speed controller configured to generate a torque command on the basis of the speed command and a motor speed. The controller is configured to control the inverter on the basis of the torque command The controller includes a torque limiter configured to start first torque limitation which limits a commanded torque based on the torque command to a first torque or less in a case where the voltage detector detects that the DC voltage falls below a predetermined voltage, and to cancel the first torque limitation in a case where the voltage detector detects that the DC voltage exceeds the predetermined voltage. The controller includes a speed limiter configured to limit a commanded speed based on the speed command to a first speed or less in a case where the torque limiter cancels the first torque limitation.

DESCRIPTION OF THE EMBODIMENTS

Hereinbelow, the embodiment will be explained with reference to the drawings.

<Configuration of Motor Control Apparatus>

Figure 1:
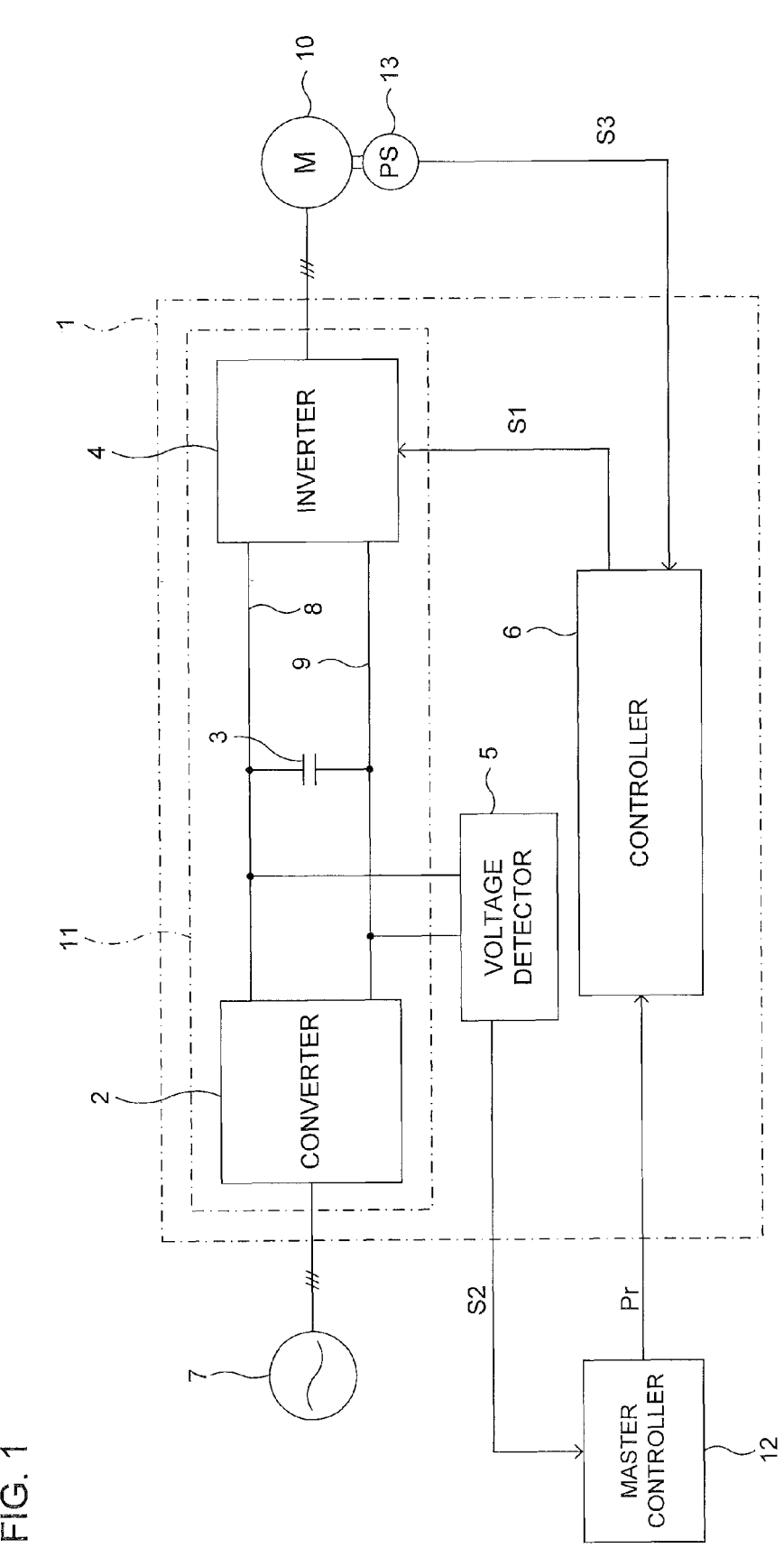
FIG. 1 is a block diagram illustrating a functional configuration of a motor control apparatus according to the embodiment.

First, a functional configuration of a motor control apparatus 1 according to this embodiment will be described with reference to FIG. 1. As illustrated in FIG. 1, the motor control apparatus 1 includes a converter 2, a smoothing capacitor 3, an inverter 4, a voltage detector 5, and a controller 6.

The converter 2 converts AC electric power supplied from an AC power supply 7 into DC electric power. The smoothing capacitor 3 is connected to a positive-side DC bus line 8 and a negative-side DC bus line 9 so as to be parallel to a DC power supply, and smooths the DC electric power converted by the converter 2. The inverter 4 converts the DC electric power into AC electric power on the basis of a control signal S1 (for example, a PWM signal) from the controller 6, and drives a motor 10. The converter 2, the smoothing capacitor 3, the inverter 4 and other parts are included in a main circuit 11.

The voltage detector 5 is connected to the positive-side DC bus line 8 and the negative-side DC bus line 9, and detects a DC voltage of the main circuit 11. Further, the voltage detector 5 sets, using parameters, a predetermined voltage serving as an undervoltage threshold value, generates and outputs a warning signal S2 to a master controller 12 if the DC voltage falls below the predetermined voltage, and stops the output of the warning signal S2 if the DC voltage exceeds (restores) the predetermined voltage. The master controller 12 outputs a torque limitation signal (not illustrated) to a function enabling and disabling processor 20, which will be described later, of the controller 6 while the warning signal S2 is being inputted from the voltage detector 5. The controller 6 mainly controls the inverter 4 on the basis of a positional command Pr from the master controller 12.

It should be noted that, in the description above, the voltage detector 5 outputs the warning signal S2 to the master controller 12, thereby performing first torque limitation via the master controller 12. However, this embodiment is not limited thereto. That is, the voltage detector 5 may directly output the warning signal S2 to the controller 6, so as to perform the first torque limitation without via the master controller 12.

A position detector 13 optically or magnetically detects the motor position (for example, angle of rotation) of the motor 10 to generate and output positional data to the controller 6 as a pulse signal S3. The controller 6 receives this pulse signal S3 as a fed back motor position Pfb (see FIG. 2), and at the same time, converts this signal into speed through, for example, difference calculation, thereby taking in this signal as a fed back motor speed Vfb (see FIG. 2). Note that a form of the positional data outputted by the position detector 13 is not limited to a pulse signal, and various forms such as serial data and analog sine waves may be possible.

<Configuration of Controller>

Figure 2:
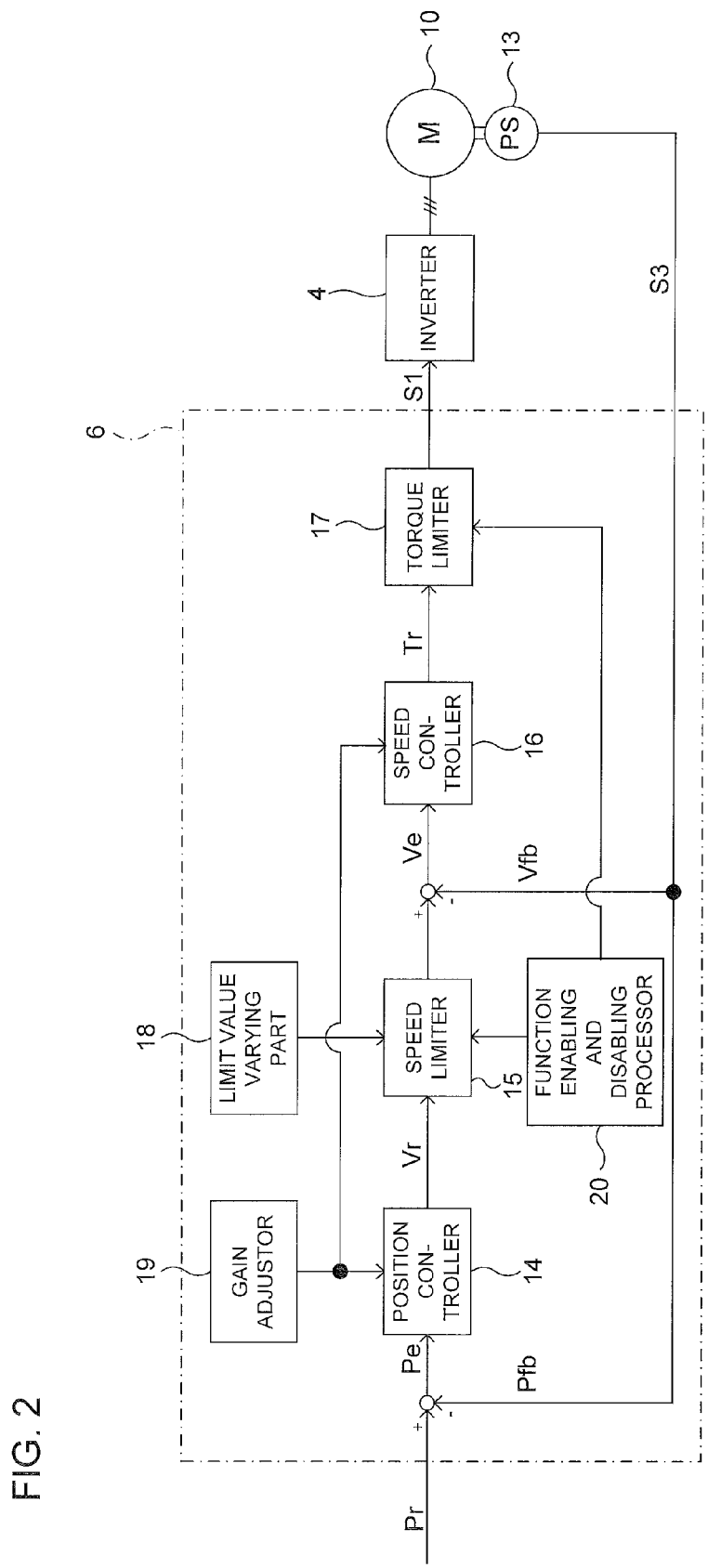
FIG. 2 is a block diagram illustrating a functional configuration of a controller of the motor control apparatus according to the embodiment.

Next, a functional configuration of the controller 6 will be described with reference to FIG. 2. As illustrated in FIG. 2, the controller 6 includes a position controller 14, a speed limiter 15, a speed controller 16, a torque limiter 17, a limit value varying part 18, a gain adjustor 19, and a function enabling and disabling processor 20.

The position controller 14 generates a speed command Vr on the basis of a positional deviation Pe between the positional command Pr from the master controller 12 and the motor position Pfb fed back from the position detector 13. The speed limiter 15 limits a commanded speed based on the speed command Vr (hereinafter, referred to as a commanded speed Vr as appropriate) to a predetermined speed limit value Vlim or less. The speed limit value Vlim is set to a given value as a parameter, and is varied by the limit value varying part 18. The speed limiting function performed by the speed limiter 15 is enabled by the function enabling and disabling processor 20 when first torque limitation, which will be described later and is performed by the torque limiter 17, is canceled, and is disabled by the function enabling and disabling processor 20 (corresponding to an example of a function disabling processor) when the positional deviation Pe becomes a predetermined positional deviation or less. The speed limiter 15 actually starts to limit the speed in the case where commanded speed Vr becomes the speed limit value Vlim or more during the time when this function is being enabled, and cancels the speed limit in the case where the commanded speed Vr falls below the speed limit value Vlim The speed controller 16 generates a torque command Tr on the basis of a speed deviation Ve between the speed command Vr and the motor speed Vfb fed back from the position detector 13. The torque limiter 17 limits a commanded torque based on the torque command Tr (hereinafter, referred to as a commanded torque Tr as appropriate) to a predetermined torque limitation value Tlim or less. The torque limitation value Tlim is set to a given value as a parameter. The torque limiting function performed by the torque limiter 17 is enabled by the function enabling and disabling processor 20 when the torque limitation signal described above is inputted from the master controller 12, and is disabled by the function enabling and disabling processor 20 when the input of the torque limitation signal is stopped. The torque limiter 17 actually starts to limit the torque in the case where the commanded torque Tr becomes the torque limitation value Tlim or more during the time when this function is being enabled, and cancels the torque limitation in the case where the commanded torque Tr falls below the torque limitation value Tlim It should be noted that, in this embodiment, the torque limitation which limits the commanded torque Tr described above to the torque limitation value Tlim (=T1. See FIG. 3) or less is referred to as "first torque limitation" as appropriate in order to distinguish it from torque limitation which limits a commanded torque, which will be described later, to a torque limitation value Tlim (=T2. See FIG. 10) or more.

The torque command Tr from the speed controller 16 is converted into the control signal S1 described above, and is outputted to the inverter 4. Note that, the controller 6 may include a torque controller (not illustrated). This torque controller converts the torque command Tr from the speed controller 16 into a current command, generates a voltage command on the basis of this current command and the fed back motor current, and generates a control signal S1 on the basis of this voltage command.

Figure 3:
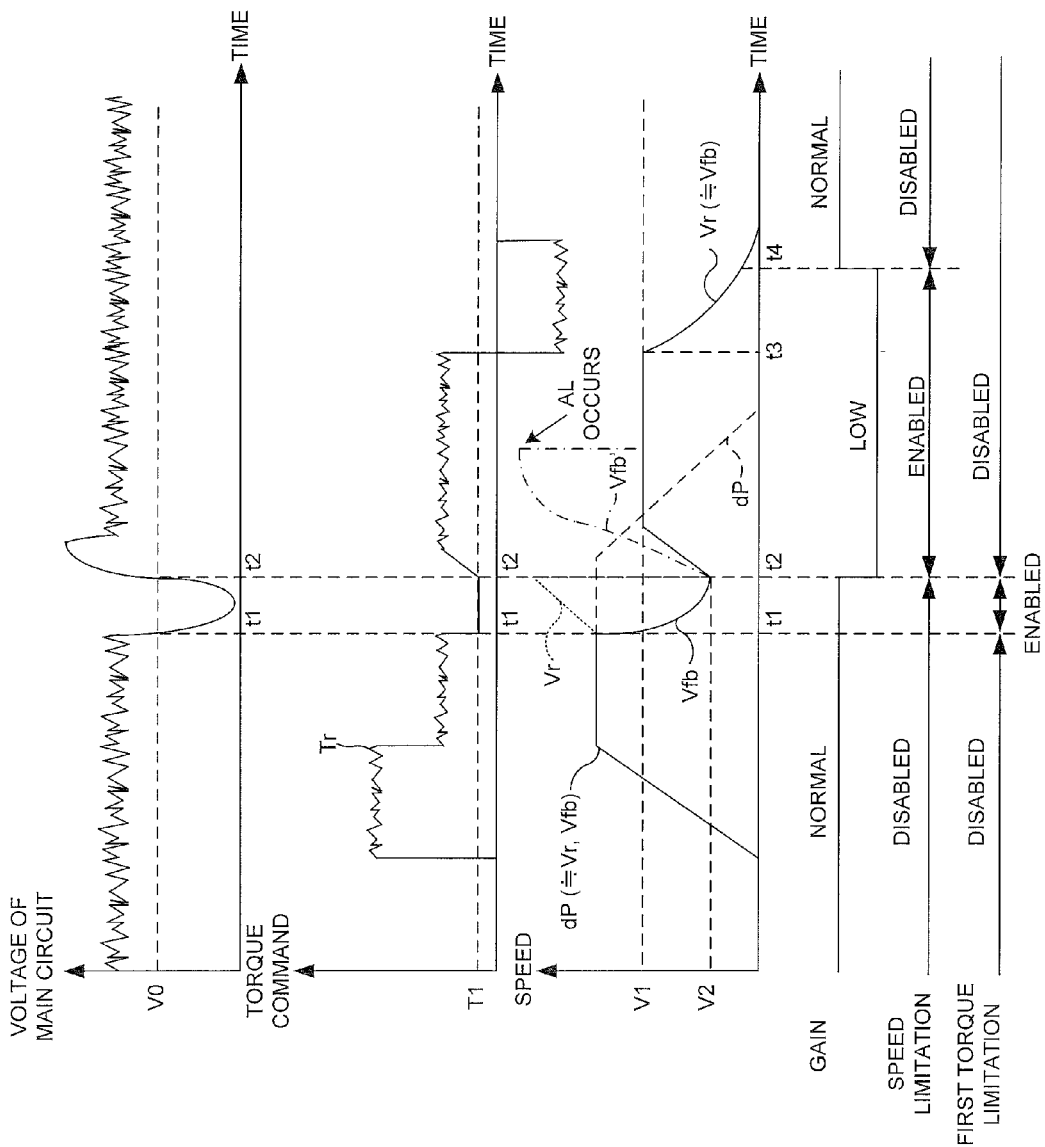
FIG. 3 is a time chart illustrating an example of an operation performed by the motor control apparatus in the case where a power supply voltage sag in a main circuit occurs.

The limit value varying part 18 varies the speed limit value Vlim of the speed limiter 15. The range and the mode of variation are set in an arbitrary manner using, for example, an upper limit value, a lower limit value, variable duration, or other information as parameters. As for the mode of variation, various types may be possible. For example, the speed limit value Vlim may be varied in a manner such that the commanded speed Vr linearly changes with a constant acceleration or deceleration, or the speed limit value Vlim may be varied in a manner such that the commanded speed Vr curvedly changes by varying the acceleration or the like. In the case where the acceleration or the like is varied, it may be varied, for example, in accordance with differences between the speed limit value Vlim and a positional command speed dP, which is a time differential value of the positional command Pr. In this embodiment, as illustrated in FIG. 3, which will be described later, the limit value varying part 18 varies the speed limit value Vlim in a manner such that the commanded speed Vr linearly accelerates with a constant acceleration from a speed V2 (corresponding to an example of a second speed), which is a motor speed at the time when the first torque limitation is canceled, to a speed V1 (corresponding to an example of a first speed). Note that, in the case where the motor speed V2 at the time when the first torque limitation is canceled is faster than the speed V1, the commanded speed Vr is linearly decelerated with a constant deceleration from the speed V2 to the speed V1.

The gain adjustor 19 reduces at least one of a position loop gain of the position controller 14 and a speed loop gain of the speed controller 16 in either of the following cases: a case where the first-torque limiting function performed by the torque limiter 17 is disabled and a case where the speed limiting function performed by the speed limiter 15 is enabled. Further, in the case where the positional deviation Pe becomes a predetermined positional deviation or less, the gain adjustor 19 restores the reduced loop gain to a value before the loop gain is reduced. Note that this gain adjustor 19, which restores this loop gain, corresponds to an example of the function disabling processor.

<Operation Performed in the Case Where Power Supply Voltage Sag in Main Circuit Occurs>

Next, with reference to FIG. 3, descriptions will be made of an example of an operation performed by the motor control apparatus 1 in the case where the DC voltage sag in the main circuit 11 occurs due to, for example, a momentary power interruption. Here, descriptions will be made of a case where the speed profile of the positional command Pr includes an acceleration, a constant speed, and a deceleration as shown by the positional command speed dP, which is a time differential value of the positional command Pr, and the power supply voltage sag in the main circuit occurs during the constant speed period.

If the voltage detector 5 detects that the DC voltage of the main circuit 11 falls below a predetermined voltage V0 (time t1), the voltage detector 5 generates and outputs the warning signal S2 to the master controller 12, and the master controller 12 outputs the torque limitation signal to the function enabling and disabling processor 20, as described above. With this operation, the function enabling and disabling processor 20 enables the torque limiting function performed by the torque limiter 17. At this time, as illustrated in FIG. 3, the torque command Tr is higher than or equal to the torque limitation value Tlim (=T1) until just before this enabling, and hence, the torque limiter 17 starts the first torque limitation at once. More specifically, in this example, a timing at which the torque limiting function performed by the torque limiter 17 is enabled and a timing at which the first torque limitation performed by the torque limiter 17 is actually started, are almost the same timing.

With this first torque limitation performed, the motor speed Vfb is reduced, and with an increase in the positional deviation Pe, the commanded speed Vr increases. Note that the positional command speed dP, the commanded speed Vr, and the motor speed Vfb take almost the same value until time t1.

Subsequently, if it is detected that the power supply voltage in the main circuit is restored from the reduced voltage and exceeds the predetermined voltage V0 (time t2), the voltage detector 5 stops outputting the warning signal S2 to the master controller 12, and the master controller 12 stops outputting the torque limitation signal to the function enabling and disabling processor 20. With this operation, the function enabling and disabling processor 20 disables the torque limiting function performed by the torque limiter 17. Since the torque limiter 17 performs the first torque limitation until just before this disabling, a timing at which the torque limiting function performed by the torque limiter 17 is disabled and a timing at which the torque limiter 17 actually cancels the first torque limitation, are almost the same timing.

Once the first torque limitation performed by the torque limiter 17 is canceled, the function enabling and disabling processor 20 enables the speed limiting function performed by the speed limiter 15. Further, at this time, the limit value varying part 18 latches the speed limit value Vlim to the speed V2, which is a motor speed at the time when the first torque limitation is canceled. With this operation, the commanded speed Vr at the time when the first torque limitation is canceled is faster than or equal to the speed limit value Vlim (=V2), and hence, the speed limiter 15 starts the speed limitation at once. In other words, in this example, a timing at which the speed limiting function performed by the speed limiter 15 is enabled and a timing at which the speed limiter 15 actually starts the speed limitation, are almost the same timing Subsequently, the limit value varying part 18 increases the speed limit value Vlim to the speed V1, which is faster than the speed V2, at a fixed rate. As a result, as illustrated in FIG. 3, the commanded speed Vr is linearly accelerated from the speed V2 to the speed V1 at a constant acceleration. Then, after the commanded speed Vr reaches the speed V1, the speed limiter 15 performs the speed limitation to limit the commanded speed Vr to the speed V1 or less during the time when the commanded speed Vr is faster than or equal to the speed limit value Vlim (=V1).

Subsequently, if the commanded speed Vr falls below the speed limit value Vlim (=V1) as the positional deviation Pe decreases (commanded speed Vr falls outside the commanded speed limitation), the speed limiter 15 cancels the speed limitation (time t3). Then, if the positional deviation Pe becomes a predetermined positional deviation or less (time t4), the function enabling and disabling processor 20 disables the speed limiting function performed by the speed limiter 15. Note that, after time t2, the commanded speed Vr and the motor speed Vfb take almost the same values.

On the other hand, if the first torque limiting function performed by the torque limiter 17 is disabled (at the same timing when the torque limiter 17 cancels the first torque limitation in the example illustrated in FIG. 3. time t2), the gain adjustor 19 reduces the loop gain. For the loop gain, although it may be possible to reduce either one of or both of the position loop gain of the position controller 14 and the speed loop gain of the speed controller 16, it is preferable to reduce the position loop gain of the position controller 14 in this case. This is because the effect of shock resulting from the change in the gain can be ignored, since a timing to start reduction in the gain and a timing to start speed limitation are almost the same timing and the speed limitation by the speed limiter 15 is already performed at the time of changing the gain. Subsequently, when the positional deviation Pe becomes a predetermined positional deviation or less (time t4), the gain adjustor 19 restores the loop gain to the value before the loop gain is reduced.

It should be noted that FIG. 3 illustrates that a timing to cancel the first torque limitation and a timing to start the speed limitation are the same timing at time t2. However, a time lag may occur between these timings because of times required for transmission and reception of signals with the master controller 12, signal processing or the like. Thus, a timing to start the gain reduction may be a timing at which the speed limiting function performed by the speed limiter 15 is enabled (at the same timing when the speed limiter 15 starts the speed limitation in the example illustrated in FIG. 3). With this configuration, it is possible to reliably perform the gain reduction at the start of the speed limitation.

<Effect of the Embodiment>

As described above, in the motor control apparatus 1 according to this embodiment, in the case where the voltage detector 5 detects that the DC voltage of the main circuit 11 falls below the predetermined voltage V0, the torque limiter 17 limits the commanded torque Tr to the torque limitation value Tlim (=T1) or less. This makes it possible to drive the motor 10 with low torque and reduce the electric power consumption, thereby making it possible to keep driving the motor 10 even in the case where the power supply voltage sag occurs in the main circuit due to a momentary power interruption or the like.

It should be noted that there is a possibility that, by performing the first torque limitation, the motor 10 cannot follow the positional command Pr, so that the positional deviation Pe increases. In this case, the motor speed Vfb may suddenly increase due to the speed command Vr corresponding to the increased positional deviation Pe when the power supply voltage in the main circuit is restored, and the motor 10 may overshoot and stop due to occurrence of an overspeed alarm AL or the like (the motor speed at this time is illustrated with the dot-and-dash line Vfb' in FIG. 3).

In this respect, in this embodiment, when the torque limiter 17 cancels the first torque limitation, the speed limiter 15 limits the commanded speed Vr to the speed limit value Vlim (=V1) or less. With this operation, even if the positional deviation Pe increases during the torque limitation, it is possible to prevent the excessive speed command Vr corresponding to the increased positional deviation Pe from being outputted to the speed controller 16 at the time of cancellation of the torque limitation, and to control the motor 10 so as to operate at appropriate speeds. Thus, it is possible to prevent the motor 10 from overshooting, thereby avoiding stopping due to, for example, occurrence of the overspeed alarm AL, and to prevent the motor 10 from stopping at the time when the power supply voltage in the main circuit is restored.

The torque limiter 17 and the speed limiter 15 correspond to an example of means for keeping a motor operating without stopping even if a momentary power interruption or a power supply voltage sag in the main circuit occurs described in claims.

Further, this embodiment can also provide the following effect. More specifically, in the case where there is a deviation between the speed limit value Vlim (=V1) and the motor speed Vfb at the time when the power supply voltage in the main circuit is restored, there is a possibility that the speed suddenly changes when the speed limitation by the speed limiter 15 starts. To address this, in this embodiment, the limit value varying part 18 varies the speed limit value Vlim of the speed limiter 15 to gradually change the commanded speed Vr from the speed V2 to the speed V1 with a predetermined acceleration, and thereby it is possible to avoid sudden acceleration of the motor 10 at the time of starting of the speed limitation and reduce the shock to the apparatus, and at the same time, it is possible to make the operation of the motor 10 smooth.

Further, this embodiment can also provide the following effect. More specifically, in the case where the speed limiter 15 performs the speed limitation, the motor 10 may suddenly decelerate when the commanded speed Vr falls below the speed V1 with the decrease in the positional deviation Pe and falls outside the commanded speed limitation (in other words, when the speed controller 16 decreases to follow the original speed command Vr), which may cause the shock to the apparatus. To address this, in this embodiment, at the time when the power supply voltage in the main circuit is restored, the gain adjustor 19 reduces at least one of the position loop gain of the position controller 14 and the speed loop gain of the speed controller 16. With this operation, the responsiveness of the motor 10 can be decreased, which makes it possible to relax the change in speeds when the commanded speed Vr falls outside the commanded speed limitation. This makes it possible to prevent the motor 10 from suddenly decelerating, thereby reducing the shock to the apparatus, and at the same time, to make the operation of the motor 10 smooth. Note that the gain adjustor 19 in this case corresponds to an example of a change relaxing part.

Further, the gain adjustor 19 reduces the gain when the first torque limitation is canceled or when the speed limitation starts. Thus, even at the time when the speed limitation starts, it is possible to obtain the effect resulting from varying the speed limit value Vlim described above and the effect of relaxing the sudden change in the commanded speed Vr in a synergistic manner. Note that, with the reduction in the gain by the gain adjustor 19, it is possible to obtain the effect of relaxing the change in the commanded speed Vr when the speed limitation starts. Thus, in this embodiment, varying the speed limit value Vlim by the limit value varying part 18 may not be performed.

Further, particularly in this embodiment, in the case where the positional deviation Pe between the positional command Pr and the motor position Pfb becomes a predetermined positional deviation or less, the function enabling and disabling processor 20 cancels the speed limitation performed by the speed limiter 15, and the gain adjustor 19 restores the loop gain to the value before the loop gain is reduced. With this operation, it is possible to reliably prevent the situation in which the speed limitation is not canceled or the loop gain is not restored to the value before the loop gain is reduced, so that the normal motor control thereafter is affected.

<Modification examples>

It should be noted that the present disclosure is not limited to the embodiment described above, and various modifications may be possible without departing from the scope or the technical idea of the present disclosure. Hereinbelow, these modification examples will be described sequentially.

Figure 4:
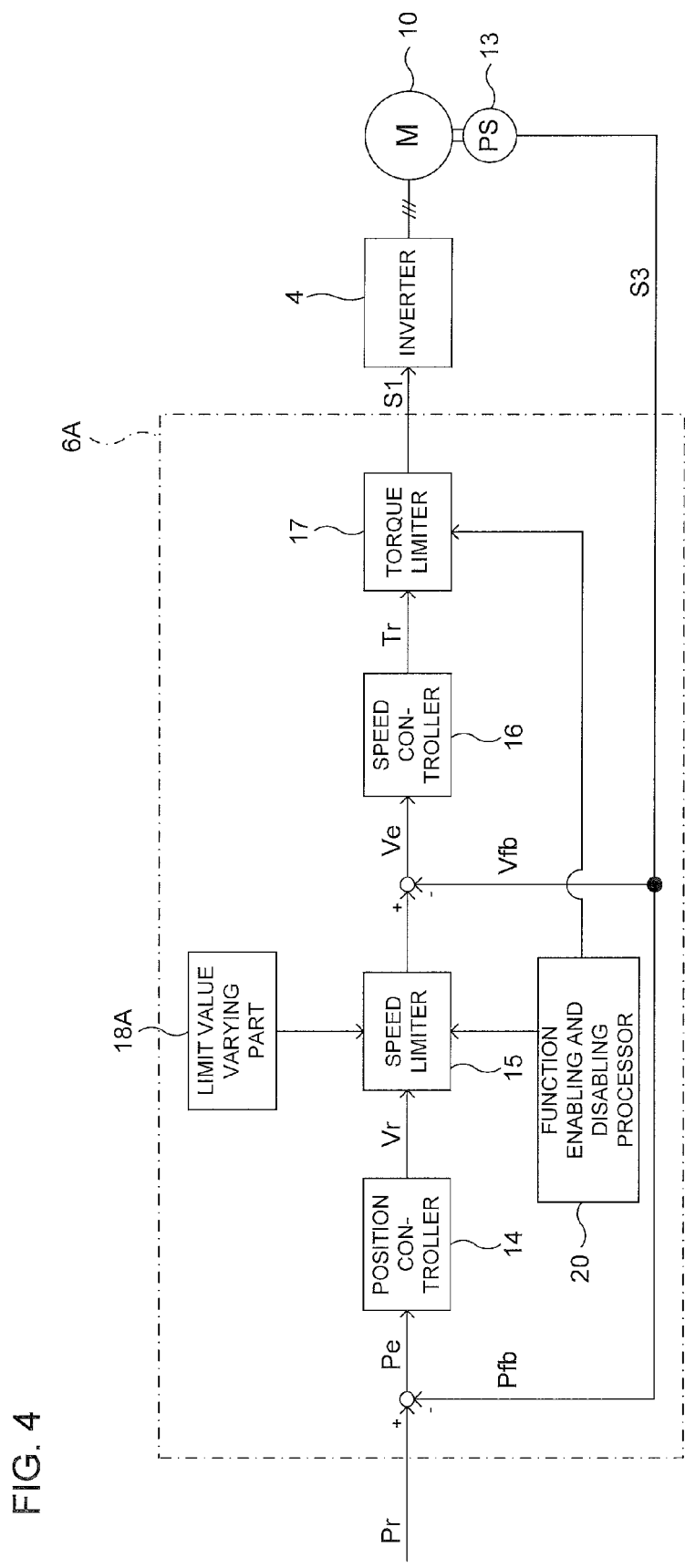
FIG. 4 is a block diagram illustrating a functional configuration of a controller according to a modification example in which speed limit values are varied to gradually reduce a commanded speed.
Figure 5:
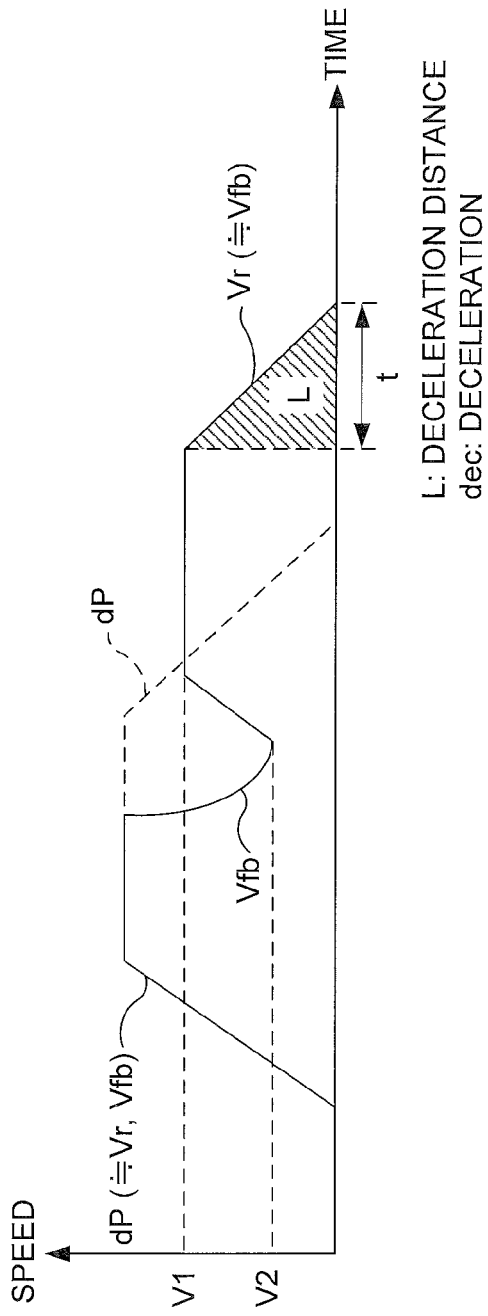
FIG. 5 is an explanatory diagram for explaining a deceleration start timing of the commanded speed.
Figure 6:
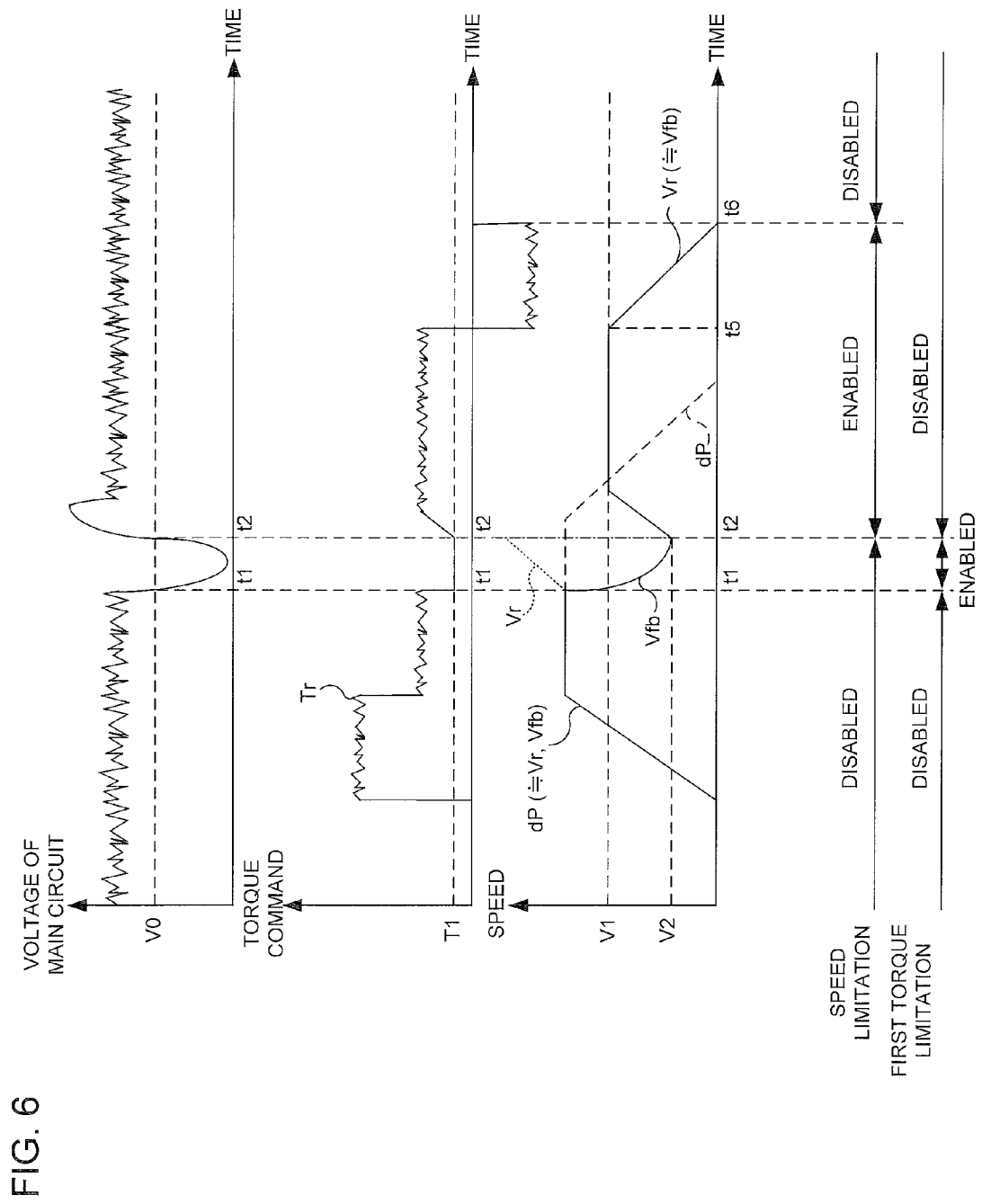
FIG. 6 is a time chart illustrating an example of an operation performed by the motor control apparatus according to the modification example in which speed limit values are varied to gradually reduce the commanded speed.

(1) Case Where the Commanded Speed is Gradually Reduced by Varying the Speed Limit Value In the embodiment described above, the sudden change in the commanded speed is relaxed by reducing the loop gain at the time when the commanded speed Vr falls outside the commanded speed limitation. However, the method of relaxing the change is not limited to this. For example, the sudden change in the commanded speed Vr may be relaxed by varying the speed limit value by the limit value varying part 18 to gradually decelerate the commanded speed Vr. With reference to FIG. 4 to FIG. 6, this modification example will be described.

As illustrated in FIG. 4, a controller 6A according to this modification example differs from the controller 6 described above in that the controller 6A includes a limit value varying part 18A in place of the limit value varying part 18, and does not include the gain adjustor 19. The limit value varying part 18A (corresponding to an example of the change relaxing part) varies the speed limit value Vlim in the speed limiter 15 at a predetermined timing, and decelerates the commanded speed Vr from the speed V1 to the speed of zero at a predetermined deceleration, in the case where the speed limiter 15 performs speed limitation which limits the commanded speed Vr to V1 or less. A timing to start deceleration of the commanded speed Vr is a timing at which the positional deviation Pe between the positional command Pr and the motor position Pfb falls below a deceleration distance L, which is a distance necessary for the motor 10 to stop in the case where the commanded speed Vr is decelerated from the speed limit value Vlim (=V1) at a predetermined deceleration dec. The predetermined deceleration dec is set to a given value as a parameter. Note that the limit value varying part 18A varies the speed limit value Vlim in a manner such that the commanded speed Vr is accelerated from the speed V2 to the speed V1 at the time when the first torque limitation is canceled, as is the case with the limit value varying part 18 described above.

Next, with reference to FIG. 5, an example of a timing to start deceleration of the commanded speed Vr will be described. As illustrated in FIG. 5, assuming that the commanded speed Vr linearly decelerates during a time t from the speed V1 to the speed of zero at a constant deceleration dec, the deceleration distance L (area of shaded portion) necessary for the motor 10 to stop is given by $(1/2) \times t \times V1$ as shown by Equation 1. Here, the deceleration dec can be expressed as V1/t as shown by Equation 2, and can be transformed into t=V1/dec as shown by Equation 3. By substitution of Equation 3 into Equation 1 and making arrangements, the deceleration distance L can be expressed as $V1^2/2dec$ as shown by Equation 4. Since the speed V1 and the deceleration dec are set as parameters, the deceleration distance L is fixed. Thus, the limit value varying part 18A monitors the positional deviation Pe between the positional command Pr and the motor position Pfb, and starts deceleration of the commanded speed Vr at the time when this positional deviation Pe falls below $V1^2/2dec$.

FIG. 6 illustrates an example of an operation performed by the motor control apparatus 1 according to this modification example. In the case where the speed limiter 15 performs the speed limitation to make the commanded speed less than or equal to V1, the limit value varying part 18A monitors the positional deviation Pe, and starts deceleration of the commanded speed Vr when this positional deviation Pe falls below the deceleration distance L (time t5). Then, the limit value varying part 18A varies the speed limit value Vlim of the speed limiter 15 to decelerate the commanded speed Vr from the speed V1 to the speed of zero at a predetermined deceleration. At the time when the commanded speed Vr becomes zero (time t6), the function enabling and disabling processor 20 disables the speed limiting function performed by the speed limiter 15. The speed limiter 15 keeps performing the speed limitation until just before this disabling, and hence, a timing at which the speed limiting function performed by the speed limiter 15 is disabled and a timing at which the speed limiter 15 actually cancels the speed limitation, are almost the same timing.

According to the present disclosure, on the basis of the positional deviation Pe according to the motor position Pfb, the limit value varying part 18A varies the speed limit value Vlim of the speed limiter 15 in a manner such that the commanded speed Vr decelerates from the speed V1 at a predetermined deceleration, and decelerates the motor 10 to stop in a state where the speed limitation is applied. With this operation, it is possible to prevent the motor 10 from suddenly decelerating, thereby reducing the shock to the apparatus, and at the same time, to make the operation of the motor 10 smooth. Further, by starting decelerating at a timing when the positional deviation Pe and the deceleration distance L are substantially equal, it is possible to accurately perform positioning on a target position.

(2) Case Where the Controller Includes a Low-Pass Filter

Figure 7:
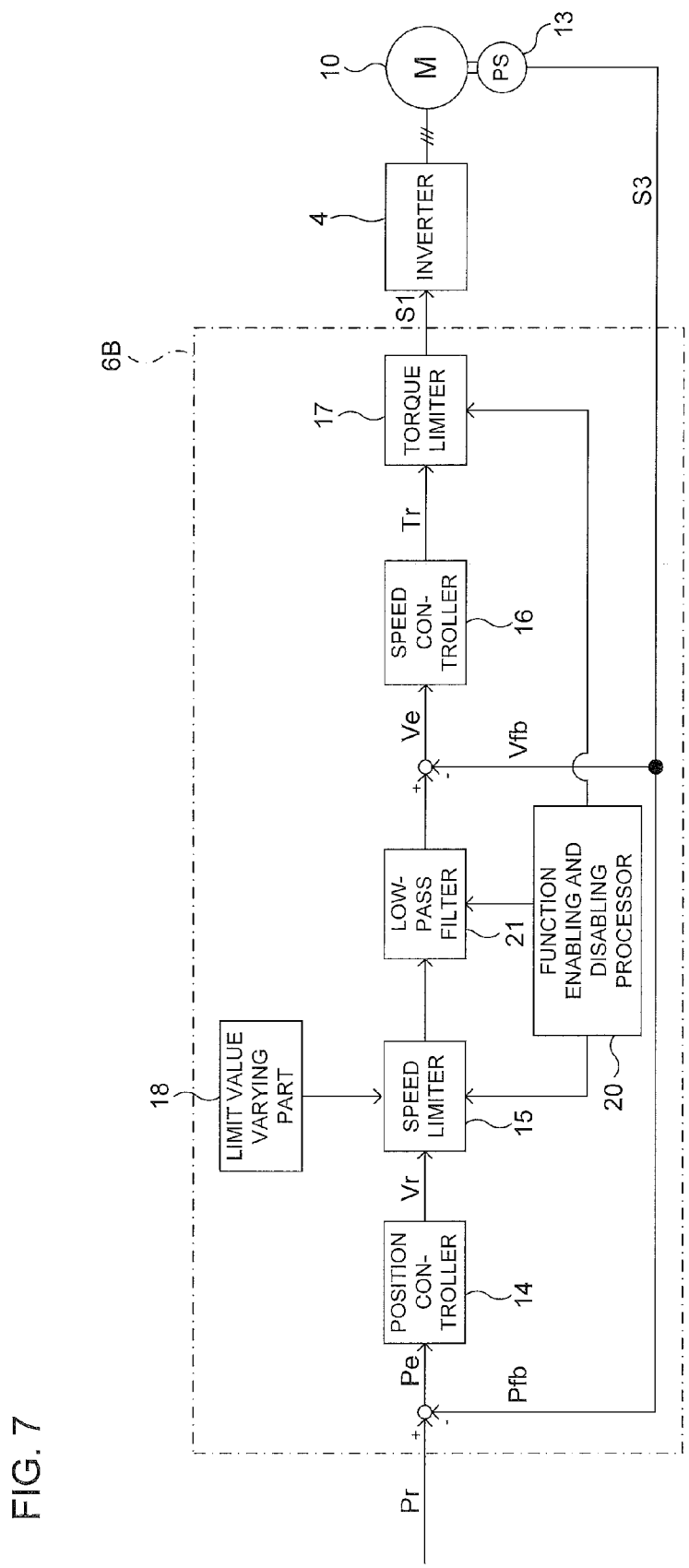
FIG. 7 is a block diagram illustrating a functional configuration of a controller according to a modification example in which the controller includes a low-pass filter.
Figure 8:
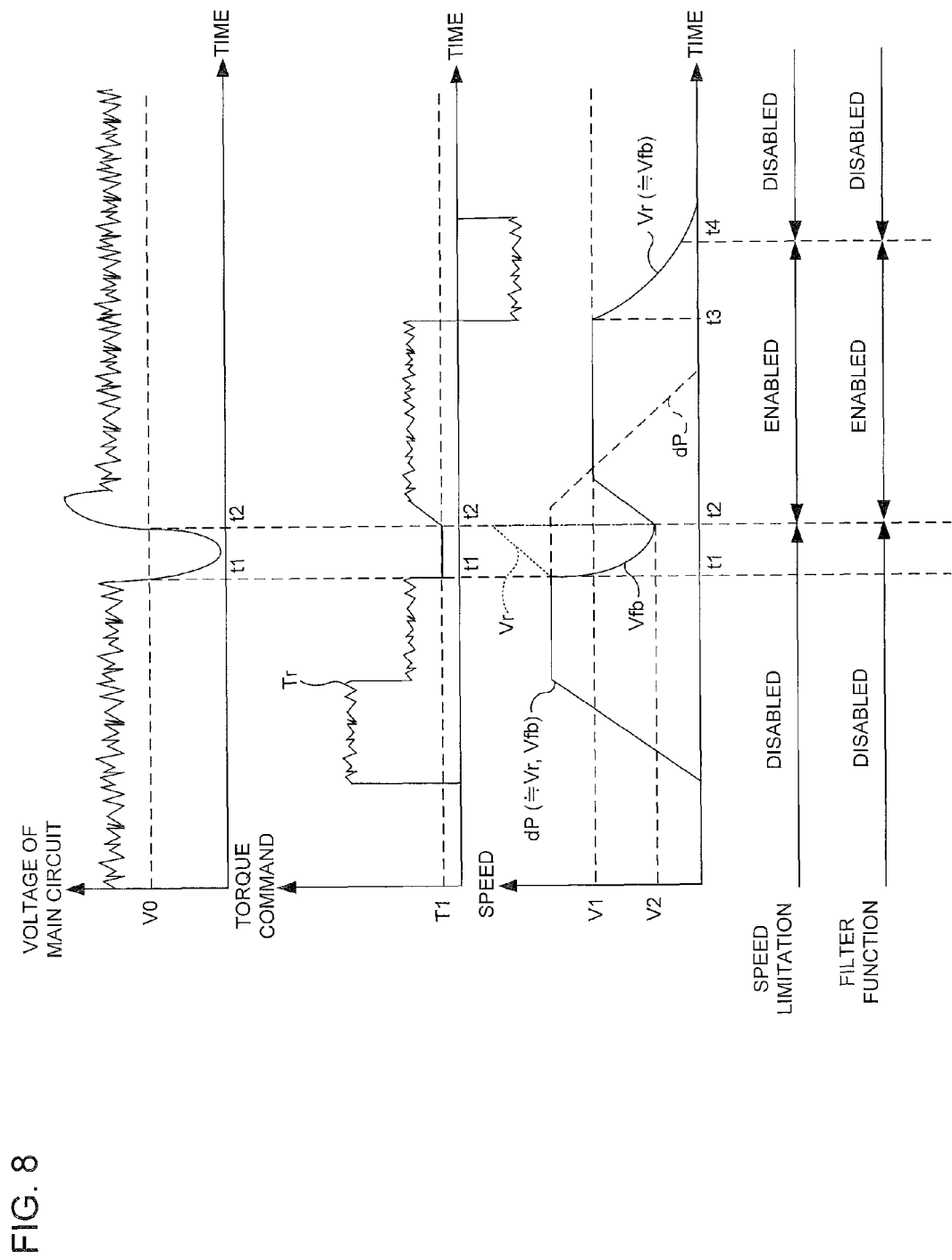
FIG. 8 is a time chart illustrating an example of an operation performed by the motor control apparatus according to the modification example in which the controller includes the low-pass filter.

In addition to the method described above, the change occurring when the commanded speed Vr falls outside the commanded speed limitation may be relaxed, for example, by disposing a low-pass filter that removes a high frequency component in the speed command Vr. With reference to FIG. 7 and FIG. 8, this modification example will be described.

As illustrated in FIG. 7, a controller 6B according to this modification example includes a low-pass filter 21 that removes the high frequency component in the speed command Yr. The function enabling and disabling processor 20 (corresponding to examples of a function enabling processor, the function disabling processor, and the change relaxing part) enables a filter function of the low-pass filter 21 at the time when the speed limiter 15 starts the speed limitation. Note that, also in this modification example, the controller 6B does not include the gain adjustor 19. For the other configuration, this modification example has a similar configuration to that of the embodiment (FIG. 2) described above.

FIG. 8 illustrates an example of an operation performed by the motor control apparatus 1 according to this modification example. As described above, the function enabling and disabling processor 20 enables the filter function of the low-pass filter 21 when the speed limiter 15 starts the speed limitation (time t2). As a result, at the time when the commanded speed Vr falls outside the commanded speed limitation, on the basis of the motor speed Vfb, the filter function of the low-pass filter 21 works to remove the high frequency component in the speed command Vr (time t3). Then, when the positional deviation Pe becomes a predetermined positional deviation or less (time t4), the function enabling and disabling processor 20 disables the speed limiting function performed by the speed limiter 15 and also disables the filter function.

According to this modification example, it is possible to suppress the sudden change in the commanded speed Vr and prevent the motor 10 from suddenly decelerating, thereby reducing the shock to the apparatus, and at the same time, to make the operation of the motor 10 smooth. Further, the filter function is disabled when the positional deviation Pe becomes the predetermined positional deviation or less. Thus, it is possible to reliably prevent the situation in which the filter function of the low-pass filter 21 is not disabled, so that the normal motor control thereafter is affected.

(3) Case Where Limitation is Applied to a Negative-Side Torque

Figure 9:
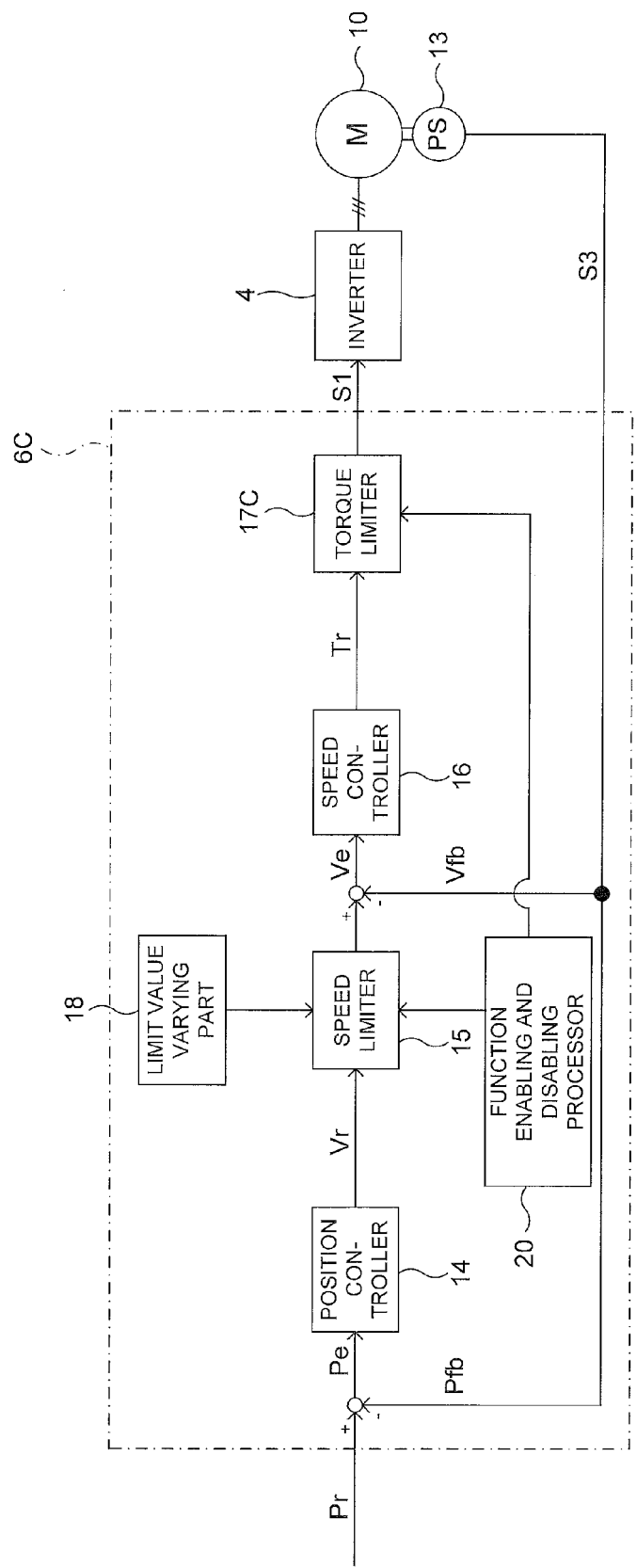
FIG. 9 is a block diagram illustrating a functional configuration of a controller according to a modification example in which limitation is applied to a negative-side torque.
Figure 10:
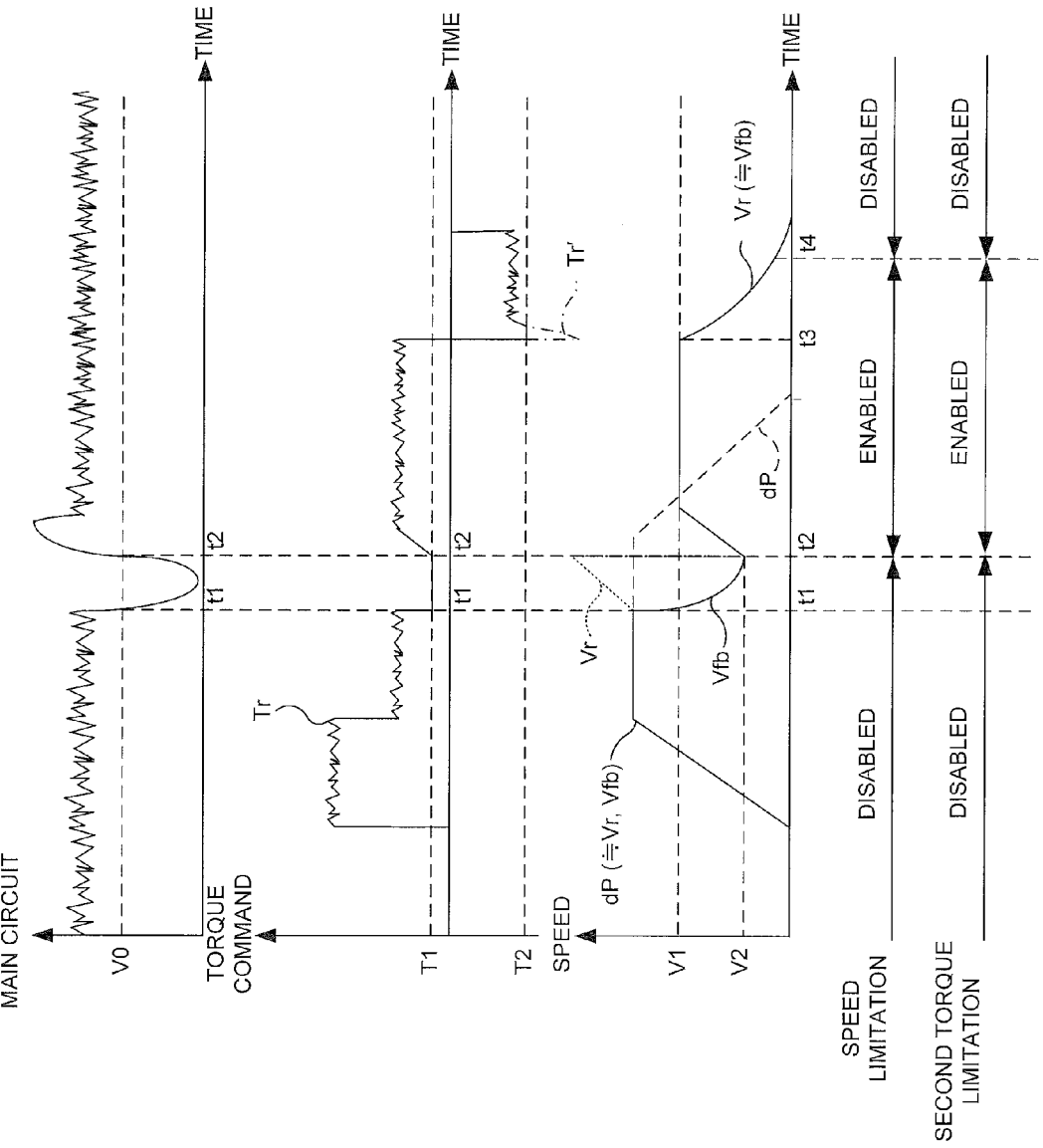
FIG. 10 is a time chart illustrating an example of an operation performed by the motor control apparatus according to the modification example in which limitation is applied to the negative-side torque.

In addition to the methods described above, the change occurring at the time when the commanded speed Vr falls outside the commanded speed limitation may be relaxed, for example, by limiting, by the torque limiter 17, fluctuations of the torque command Tr toward the negative side when the commanded speed Vr falls outside the commanded speed limitation. With reference to FIG. 9 and FIG. 10, this modification example will be described.

As illustrated in FIG. 9, a controller 6C according to this modification example differs from the controller 6 described above in that the controller 6C includes a torque limiter 17C in place of the torque limiter 17, and does not include the gain adjustor 19. In addition to the first torque limitation, the torque limiter 17C performs a second torque limitation which limits the commanded torque Tr to a torque limitation value Tlim (=T2) or more. The torque limitation value T2 is set to a given value as a parameter. The second torque limiting function performed by the torque limiter 17C is enabled by the function enabling and disabling processor 20 (corresponding to an example of the change relaxing part) at the time when the speed limiter 15 starts the speed limitation (time t2), and is disabled by the function enabling and disabling processor 20 at the time when the positional deviation Pe becomes a predetermined positional deviation or less (time t4). The torque limiter 17C actually starts the second torque limitation in the case where the commanded torque Tr becomes the torque limitation value Tlim (=T2) or less during the time when this function is being enabled, and cancels the second torque limitation in the case where the commanded torque Tr exceeds the torque limitation value Tlim (=T2).

FIG. 10 illustrates an example of an operation performed by the motor control apparatus 1 according to this modification example. When the commanded torque Tr largely fluctuates toward the negative side (illustrated with the dot-and-dash line Tr' in FIG. 10) when the commanded speed Vr falls below the speed V1 and falls outside the commanded speed limitation after the speed limiter 15 performs the speed limitation, the motor 10 suddenly decelerates, which may cause the shock to the apparatus. To address this, as described above, the second torque limitation is enabled by the function enabling processor 20 at the time when the speed limitation starts, whereby the second torque limitation is caused to function to the torque command Tr based on the motor position Pfb and the motor speed Vfb when the commanded speed Vr falls outside the commanded speed limitation (when the commanded torque Tr becomes T2 or less). With this operation, it is possible to apply limitation to the negative-side torque occurring at the moment when the commanded speed Vr falls outside the commanded speed limitation. As a result, it is possible to prevent the motor 10 from suddenly decelerating, thereby reducing the shock to the apparatus, and at the same time, to make the operation of the motor 10 smooth. Further, if the positional deviation Pe becomes a predetermined positional deviation or less, the second torque limitation is disabled. Thus, it is possible to reliably prevent the situation in which the second torque limitation is not canceled, so that the normal motor control thereafter is affected.

Further, in addition to the embodiment and modification examples described above, it may be possible to combine the methods according to at least one of the embodiment described above and each of the modification examples, and use it as appropriate.

Further, the present disclosure is implemented with various modifications without departing from the scope of the present disclosure, although examples thereof are not illustrated herein.

What is claimed is:

1. A motor control apparatus comprising:
   a main circuit including a converter configured to convert AC power supply into DC power supply, a smoothing capacitor connected in parallel with the DC power supply, and an inverter configured to convert the DC power supply into AC power supply to drive a motor;
   a voltage detector configured to detect DC voltage of the main circuit; and a controller including a position controller configured to generate a speed command on the basis of a positional command and a motor position, and a speed controller configured to generate a torque command on the basis of the speed command and a motor speed, the controller being configured to control the inverter on the basis of the torque command, the controller includes:

a torque limiter configured to start first torque limitation which limits a commanded torque based on the torque command to a first torque or less in a case where the voltage detector detects that the DC voltage falls below a predetermined voltage, and to cancel the first torque limitation in a case where the voltage detector detects that the DC voltage exceeds the predetermined voltage; and a speed limiter configured to limit a commanded speed based on the speed command to a first speed or less in a case where the torque limiter cancels the first torque limitation.

2. The motor control apparatus according to claim 1, wherein the controller includes a limit value varying part configured to vary a speed limit value of the speed limiter in a manner such that the commanded speed changes from a second speed, which is the motor speed at the time of cancellation of the first torque limitation, to the first speed at a predetermined acceleration or deceleration.

3. The motor control apparatus according to claim 1, wherein the controller includes a gain adjustor configured to reduce at least one of a loop gain of the position controller and a loop gain of the speed controller, in the case where the torque limiter cancels the first torque limitation or in the case where the speed limiter starts the speed limitation.

4. The motor control apparatus according to claim 1, wherein the controller includes a change relaxing part configured to relax a sudden change in the commanded speed on the basis of at least one of the motor position and the motor speed, in a case where the commanded speed falls outside commanded speed limitation.

5. The motor control apparatus according to claim 4, wherein the change relaxing part serves as a limit value varying part configured to vary a speed limit value of the speed limiter in a manner such that the commanded speed decelerates from the first speed at a predetermined deceleration, in a case where a positional deviation between the positional command and the motor position falls below a deceleration distance, which is a distance necessary for the motor to stop if the commanded speed is decelerated from the first speed at the predetermined deceleration.

6. The motor control apparatus according to claim 4, wherein the controller includes a low-pass filter configured to remove a high frequency component in the speed command, and the change relaxing part serves as a function enabling processor configured to enable a filter function of the low-pass filter at a time when the speed limiter starts the speed limitation.

7. The motor control apparatus according to claim 4, wherein the change relaxing part serves as a function enabling processor configured to enable second torque limitation which limits the commanded torque to a second torque or more, at a time when the speed limiter starts the speed limitation.

8. The motor control apparatus according to claim 1, wherein the controller includes a function disabling processor configured to cancel the speed limitation performed by the speed limiter, in a case where a positional deviation between the positional command and the motor position becomes a predetermined positional deviation or less, or to restore the loop gain to a value before the loop gain is reduced, or to disable the filter function, or to cancel the second torque limitation.

9. The motor control apparatus according to claim 2, wherein the controller includes a change relaxing part configured to relax a sudden change in the commanded speed on the basis of at least one of the motor position and the motor speed, in a case where the commanded speed falls outside commanded speed limitation.

10. The motor control apparatus according to claim 3, wherein the controller includes a change relaxing part configured to relax a sudden change in the commanded speed on the basis of at least one of the motor position and the motor speed, in a case where the commanded speed falls outside commanded speed limitation.

11. The motor control apparatus according to claim 9, wherein the change relaxing part serves as a limit value varying part configured to vary a speed limit value of the speed limiter in a manner such that the commanded speed decelerates from the first speed at a predetermined deceleration, in a case where a positional deviation between the positional command and the motor position falls below a deceleration distance, which is a distance necessary for the motor to stop if the commanded speed is decelerated from the first speed at the predetermined deceleration.

12. The motor control apparatus according to claim 9, wherein the controller includes a low-pass filter configured to remove a high frequency component in the speed command, and the change relaxing part serves as a function enabling processor configured to enable a filter function of the low-pass filter at a time when the speed limiter starts the speed limitation.

13. The motor control apparatus according to claim 9, wherein the change relaxing part serves as a function enabling processor configured to enable second torque limitation which limits the commanded torque to a second torque or more, at a time when the speed limiter starts the speed limitation.

14. The motor control apparatus according to claim 10, wherein the change relaxing part serves as a limit value varying part configured to vary a speed limit value of the speed limiter in a manner such that the commanded speed decelerates from the first speed at a predetermined deceleration, in a case where a positional deviation between the positional command and the motor position falls below a deceleration distance, which is a distance necessary for the motor to stop if the commanded speed is decelerated from the first speed at the predetermined deceleration.

15. The motor control apparatus according to claim 10, wherein
the controller includes a low-pass filter configured to remove a high frequency component in the speed command, and
the change relaxing part serves as a function enabling processor configured to enable a filter function of the low-pass filter at a time when the speed limiter starts the speed limitation.

16. The motor control apparatus according to claim 10, wherein
the change relaxing part serves as a function enabling processor configured to enable second torque limitation which limits the commanded torque to a second torque or more, at a time when the speed limiter starts the speed limitation.

17. The motor control apparatus according to claim 2, wherein
the controller includes
a function disabling processor configured to cancel the speed limitation performed by the speed limiter, in a case where a positional deviation between the positional command and the motor position becomes a predetermined positional deviation or less, or to restore the loop gain to a value before the loop gain is reduced, or to disable the filter function, or to cancel the second torque limitation.

18. The motor control apparatus according to claim 3, wherein
the controller includes
a function disabling processor configured to cancel the speed limitation performed by the speed limiter, in a case where a positional deviation between the positional command and the motor position becomes a predetermined positional deviation or less, or to restore the loop gain to a value before the loop gain is reduced, or to disable the filter function, or to cancel the second torque limitation.

19. The motor control apparatus according to claim 4, wherein
the controller includes
a function disabling processor configured to cancel the speed limitation performed by the speed limiter, in a case where a positional deviation between the positional command and the motor position becomes a predetermined positional deviation or less, or to restore the loop gain to a value before the loop gain is reduced, or to disable the filter function, or to cancel the second torque limitation.

* * * * *